3,038,907
ISOBUTYRALDEHYDE CONDENSATION
PRODUCT
Wayne V. McConnell and Herman E. Davis, Kingsport, Tenn., assignors to Eastman Kodak Company, Rochester, N.Y., a corporation of New Jersey
No Drawing. Filed Apr. 4, 1960, Ser. No. 19,497
5 Claims. (Cl. 260—340.7)

This invention relates to an isobutyraldehyde condensation product, and more particularly to a high-molecular-weight compound prepared by condensing isobutyraldehyde with itself in the presence of an acid catalyst.

Our novel product is prepared by heating isobutyraldehyde for a few hours in the presence of an acid catalyst. The acid is then neutralized and the mixture washed with water. The product is distilled, the fraction boiling at approximately 120–130° C./0.3 mm. being collected. The product is a colorless, mobile liquid which, after redistillation, has the following properties:

B.P. _____ 120–122° C./0.2 mm.
$n_D^{20}$ _____ 1.4490
$d_4^{20}$ _____ 0.9595

Elementary analysis and molecular weight determinations indicate the empirical formula of the product to be $C_{24}H_{46}O_5$.

| Analysis | Found | Calcd. for $C_{24}H_{46}O_5$ |
|---|---|---|
| Percent Carbon | 69.7 | 69.6 |
| Percent Hydrogen | 11.2 | 11.1 |
| Molecular Weight | 412 | 414 |

The formula $C_{24}H_{46}O_5$ corresponds to a compound which would result from the condensation of six moles of isobutyraldehyde with the loss of one mole of water. Analysis of our product indicates the presence of only a trace of hydroxyl. A structure which agrees with the data shown is

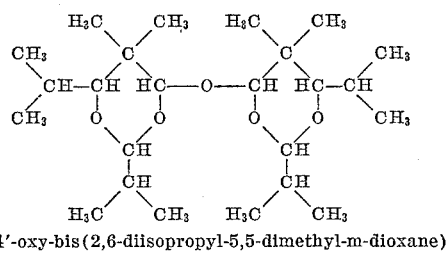

4,4′-oxy-bis(2,6-diisopropyl-5,5-dimethyl-m-dioxane)

Infrared studies, derivative formation, and nuclear magnetic resonance spectrum also indicate this to be a logical structure.

The process of preparing our novel product is illustrated, but not limited, by the following examples.

Example 1.—A mixture of 216 g. of isobutyraldehyde and 6.5 g. (3% based on the aldehyde) of p-toluenesulfonic acid monohydrate was refluxed for 4 hr. After this reflux period, 100 ml. of 5% sodium bicarbonate was added and the unreacted isobutyraldehyde was distilled from the mixture. The residue was mixed with 100 ml. of cyclohexane and the organic layer washed with three 100 ml. portions of water. The organic solution was then distilled, the fraction boiling at 123–130° C./0.3 mm. being collected. 104 g. of this fraction was obtained, representing a conversion of 48%. Yields of greater than 90% are obtainable, since the other compounds recovered are isobutyraldehyde and lower-molecular-weight condensation products of isobutyraldehyde which can be readily converted to the aldehyde by conventional procedures well known in the art.

Other water immiscible solvents may be used in place of cyclohexane. As an alternative method of isolation of the product, after the addition of the sodium bicarbonate the reaction mixture may be washed with water and dried over sodium sulfate, then distilled under vacuum, the fraction boiling at 125–130° C./0.3 mm. being collected. The compound may be stabilized by the addition of 0.01% of 4-hydroxy-3,5-di-tertiary-butyl toluene ("butylated hydroxy toluene").

Example 2.—Isobutyraldehyde (360 g.) and 1.8 g. (0.5% based on the aldehyde) of boron trifluoride was refluxed for 7 hr. The reaction mixture was worked up as described in Example 1 giving 112 g. (31% conversion) of product distilling at 120–129° C./0.3 mm.

Example 3.—A mixture of 360 g. of isobutyraldehyde and 3.6 g. (1% based on the aldehyde) of concentrated sulfuric acid was refluxed for 4 hr. These conditions led to a 32% conversion (115 g.) of the product; B.P. 125–132° C./0.4 mm.

Other acid catalysts may be used in place of those shown in the examples. Other alkaline reagents, such, for example, as the hydroxides or carbonates of the alkali or alkaline earth metals, or ammonium hydroxide may be used to neutralize the catalyst. In some cases sodium acetate or potassium acetate is suitable for this purpose.

The effects of certain variables on the conversion to the claimed condensation product are illustrated in Table 1.

TABLE 1

Effect of Reaction Conditions on Conversions to the Isobutyraldehyde Condensation Product

| Catalyst | Catalyst Concentration (w./w.), Percent | Temperature, °C. | Reaction Time, Hr. | Conversion to the New Condensation Product, Percent |
|---|---|---|---|---|
| Boron Trifluoride | 0.5 | 65–75 | 4 | 26 |
| Do | 0.5 | 65–75 | 7 | 31 |
| Do | 3.0 | 65–75 | 4 | 28 |
| Sulfuric Acid | 1.0 | 65–75 | 4 | 32 |
| p-Toluenesulfonic Acid | 0.3 | 65–75 | 4 | 10 |
| Do | 3.0 | 65–75 | 4 | 48 |
| Do | 10.0 | 65–75 | 4 | 28 |
| Do | 3.0 | 65–75 | 1 | 38 |
| Do | 3.0 | 65–75 | 24 | 40 |
| Do | 3.0 | 25–30 | 24 | <5 |
| Do | 3.0 | 150 | 4 | <5 |

The claimed isobutyraldehyde condensation product is compatible with cellulose organic esters, such, for instance, as cellulose acetate butyrate, and with certain vinyl plastics, and modifies the properties of compositions containing these substances. One of the properties affected is the adhesiveness of the plastic to other surfaces. Cellulose organic esters containing our novel compound adhere to hard surfaces such as glass much more strongly than does the cellulose ester by itself.

We claim:

1. The compound having the empirical formula $C_{24}H_{46}O_5$ and the following properties: B.P. 120–122° C./0.2 mm., $n_D^{20}$ 1.4490, $d_4^{20}$ 0.9595, formed by heating isobutyraldehyde in the presence of an acid catalyst at a temperature greater than 30° C. but less than 150° C.

2. A process of preparing a compound having the empirical formula $C_{24}H_{46}O_5$ which comprises heating isobutyraldehyde with an acid catalyst at a temperature of approximately 65–75° C. annd recovering the product.

3. A process of preparing a compound having the empirical formula $C_{24}H_{46}O_5$ which comprises heating isobutyraldehyde with approximately 3% of its weight of p-toluenesulfonic acid as a catalyst at a temperature of approximately 65-75° C. for a period of from 1 to 24 hours and recovering the product.

4. The process which comprises heating isobutyraldehyde with approximately 0.5 to 10% of its weight of an acid catalyst selected from the group consisting of p-toluenesulfonic acid, boron trifluoride and sulfuric acid at a temperature greater than 30° C. but less than 150° C. for a period from 1 to 24 hours, neutralizing the acid catalyst, distilling the resulting mixture, and recovering a fraction boiling at approximately 120-130° C./0.3 mm.

5. The process which comprises heating isobutyraldehyde with approximately 0.5 to 3% of its weight of an acid catalyst selected from the group consisting of p-toluenesulfonic acid, boron trifluoride and sulfuric acid at a temperature of approximately 65-75° C. for a period from 1 to 24 hours, neutralizing the acid catalyst, water-washing and distilling the resulting mixture and recovering a fraction boiling at approximately 120-130° C./0.3 mm. and comprising a compound having the empirical formula $C_{24}H_{46}O_5$.

References Cited in the file of this patent

UNITED STATES PATENTS

| 2,517,013 | Miller et al. | Aug. 1, 1950 |
| 2,829,169 | Hagemeyer | Apr. 1, 1958 |